(12) United States Patent
Albrecht

(10) Patent No.: US 6,226,154 B1
(45) Date of Patent: May 1, 2001

(54) ASYMMETRIC LOAD/UNLOAD RAMP AND DISK DRIVE USING SAME

(75) Inventor: David William Albrecht, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/313,224

(22) Filed: May 17, 1999

(30) Foreign Application Priority Data

Jun. 11, 1998 (JP) .................................................. 10-163599

(51) Int. Cl.[7] .............................. G11B 5/54; G11B 21/22
(52) U.S. Cl. ....................................... 360/254.8; 360/254.7
(58) Field of Search .............................. 360/97.01, 98.01, 360/254.7, 254.8, 254.9, 255.6, 255.7, 255.8

(56) References Cited

U.S. PATENT DOCUMENTS 5,341,260 * 8/1994 Jabbari ................................. 360/105
6,067,209 * 5/2000 Aoyagi et al. ....................... 360/105

\* cited by examiner

*Primary Examiner*—William Klimowicz
(74) *Attorney, Agent, or Firm*—Douglas R. Millett

(57) ABSTRACT

A load/unload ramp in a disk drive has first and second compound surfaces located on opposite sides of the median plane of the disk. Each compound surface has a parking surface disposed outside the disk perimeter. When the read/write heads of the disk drive are unloaded from the disk, the head suspension assemblies that support the heads are parked on the parking surfaces. One of the two parking surfaces is farther than the other parking surface from the median plane of the disk, providing increased separation between the parked read/write heads, thereby improving the ability of the disk drive to withstand shock.

13 Claims, 9 Drawing Sheets

ASYMMETRIC LOAD/UNLOAD RAMP AND DISK DRIVE USING SAME

BACKGROUND OF THE INVENTION

The present invention relates generally to a disk drive having a load/unload ramp, and in particular to improvements in the load/unload ramp.

FIG. 1 shows a plan view of a typical disk drive having a single disk 8 that spins between two head suspension assemblies 24A, 24B (only one head suspension assembly 24A is visible). To access different data tracks, the head suspension assemblies are moved by an actuator arm 25 in the radial direction of the disk. The actuator arm 25 is turned on a shaft 21 by a voice coil motor, as described later.

As shown in FIG. 2, each head suspension assembly comprises a load beam 26A (26B) attached to the actuator arm 25, a tab 28A (28B) located at the tip of the load beam, a flexure 30A (30B) attached to the load beam, a slider 11A (11B) attached to the flexure, and a read/write head 12A (12B) attached to the slider. The flexure is a delicate structure that allows the slider to pitch and roll against a dimple (not visible) in the load beam, in compliance with the disk surface, for proper air-bearing performance as the slider flies above the spinning disk.

The load/unload (LUL) ramp 40 in FIG. 1 provides a safe place to park the head suspension assemblies when the disk is not spinning, to prevent contact between the sliders and the surface of the stationary disk.

FIG. 3 shows a sectional view of a conventional LUL ramp 40, also showing the outer edge of the disk 8 with the sliders 11A, 11B and tabs 28A, 28B. The flexures have been omitted for simplicity.

To unload the sliders from the disk, the load beams move to the right in FIG. 3. The load-beam tabs 28A, 28B land on inclined lifting slopes 44 at the front of the LUL ramp and travel up the lifting slopes, across maximum lift surfaces 46, and down back slopes 48 to reach parking surfaces 50, as indicated by the dotted arrows. As the tabs 28A, 28B ascend the lifting slopes, the sliders 11A, 11B are lifted away from the disk 8. When the sliders are loaded onto the disk, the above motions are performed in reverse.

The lifting slopes 44 must be high enough to allow for variations in the landing point of the load-beam tabs, and to provide at least a minimum necessary lift in the worst case. The inclination of the lifting slopes must be sufficiently gradual that the sliders do not approach the surface of the disk too rapidly when being loaded. The back slopes 48 must be high enough to prevent unintended escape of the load-beam tabs from the parking surfaces 50. In a disk drive with a small form factor, to minimize the dimensions of the LUL ramp, the lifting slopes 44 are generally made as low, short, and steep as possible within these constraints. Minimizing the height of the lifting slopes 44 has the added advantage of minimizing the energy needed to unload and park the sliders. A conventional LUL ramp is symmetric with respect to the median plane 7 of the disk 8; both lifting slopes 44 have the same minimum height and maximum inclination, and in the parked position, the sliders are separated by a distance comparable to the thickness of the disk.

A problem is that the flexure design characteristics that allow the sliders to pitch and roll while flying over the disk also allow the sliders to pitch and roll in their parked position. Violent pitching and rolling motions can occur in response to shock forces, as when the disk drive is dropped. To aggravate the problem, since the flexures are only lightly loaded against the load-beam dimples, shock forces can easily separate the flexures from the dimples, allowing the sliders to come closer together. Thus while the sliders cannot contact the disk surface in their parked positions, which are outside the disk perimeter, the parked sliders can collide with each other. Such collisions can damage the air-bearing surfaces of the sliders, possibly rendering the disk drive inoperable.

To prevent such collisions, U.S. Pat. No. 6,067,209, filed Jun. 17, 1998 by A. Aoyagi, D. W. Albrecht (the present inventor) and others, provides the LUL ramp with limiter surfaces that interact with tab-like extensions of the flexures. The limiter surfaces restrict the movement of the flexures in the parked position, as will be described later. For complete collision prevention, a separator plate can also be inserted between the sliders.

However, because of the continuing reduction in disk drive dimensions, including disk diameter, disk drive thickness, and disk thickness, the separation between the parked sliders is becoming very small. For instance, in a disk drive which is currently envisaged, the thickness of the disk is on the order of 0.4 to 0.6 mm, and the distance between the parked sliders is on the same order. With such a narrow separation, the sliders may collide during shock events despite the above-mentioned limiter surfaces. If a separation plate is inserted, then instead of colliding with each other, the sliders may become contaminated by contact with the separation plate, leading to contamination of the disk surface, again with adverse effects on air-bearing performance.

In this connection, it should be noted that disk drives of a very small size are likely to be used in handheld devices, such as digital cameras. In these applications, the disk drive will often be a removable storage unit, which is apt to be roughly handled or dropped, and therefore experience severe shock forces.

SUMMARY OF THE INVENTION

An object of the invention is to reduce the possibility of shock-induced collision between the sliders.

Briefly, in a preferred embodiment of the present invention, the load/unload ramp has first and second compound surfaces disposed on opposite sides of the median plane of a disk in a disk drive. Each compound surface has a parking surface disposed outside the disk perimeter. The disk drive has load beams with read/write heads and tabs. When the read/write heads are unloaded from the disk, the tabs engage the load/unload ramp and finally come to rest on the parking surfaces. One of the two parking surfaces is farther than the other parking surface from the median plane of the disk.

By placing one parking surface farther away from the median plane of the disk, the invention increases the separation between the read/write heads in the parked position, reducing the possibility of collision between the sliders on which the read/write heads are mounted.

The invention also provides a disk drive with a load/unload ramp having the features described above.

For a fuller understanding of the nature and advantages of the present invention, reference should be made to the following detailed description taken in conjunction with the accompanying drawings.

DETAILED DESCRIPTION OF THE INVENTION

Figure 1:
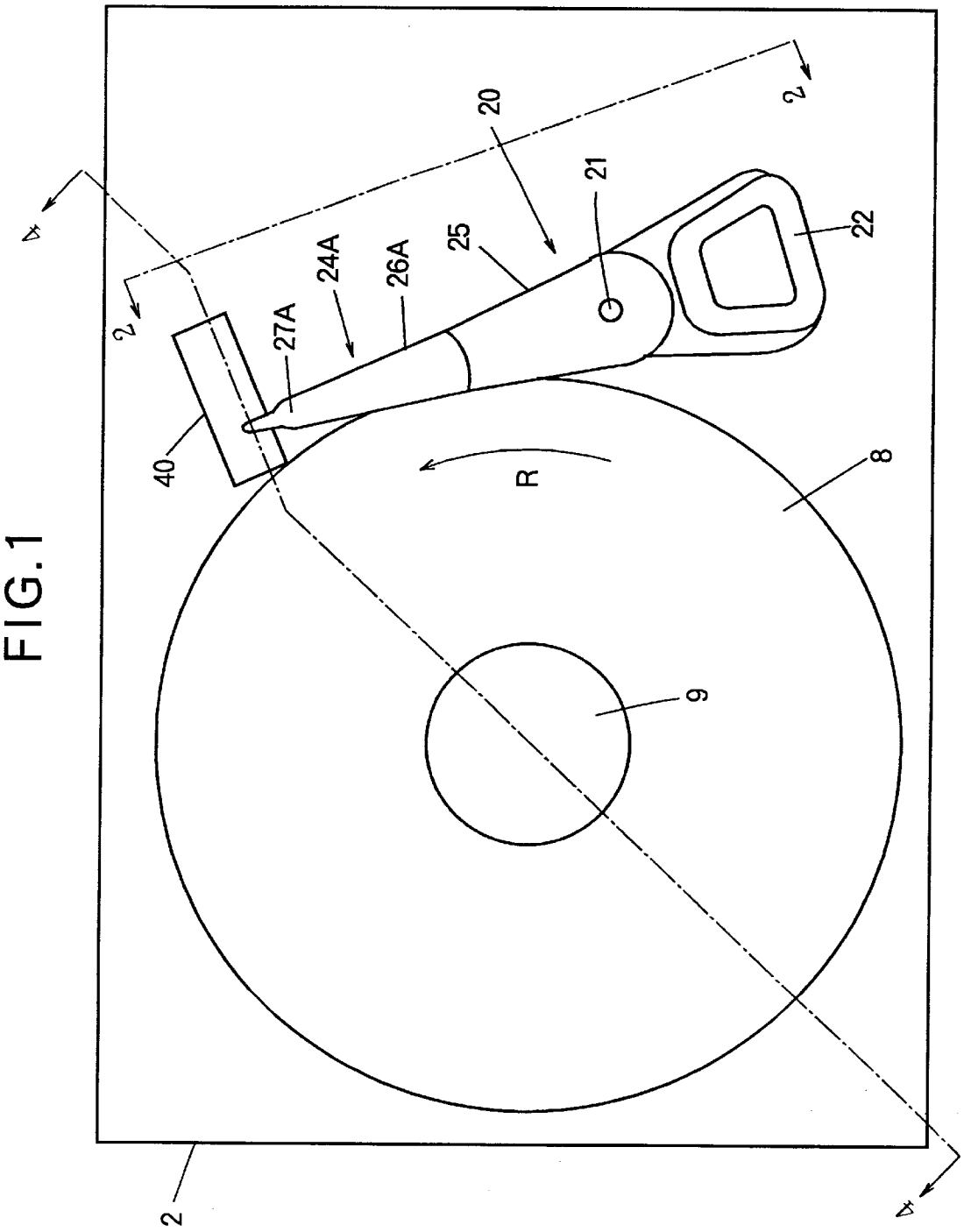
FIG. 1 is a general plan view of a hard disk drive.

An embodiment of the invention will be described with reference to the drawings, in which like parts are designated by like reference characters.

Figure 4:
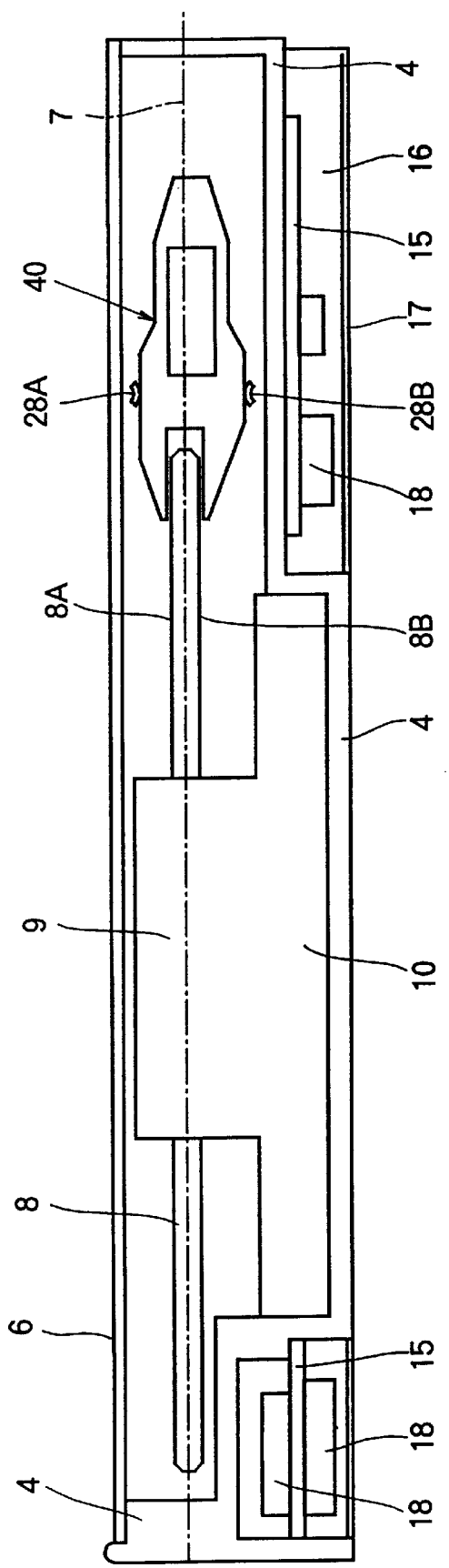
FIG. 4 is a sectional view through line 4—4 in FIG. 1, illustrating an embodiment of the invention.

The disk drive of this embodiment is a small hard disk drive of the general type shown in FIG. 1, with a housing 2 comprising a base 4 and top cover 6 as shown in FIG. 4. The base 4 is a tub-shaped member, commonly die-cast, with a floor and walls within which the other components of the disk drive are mounted. One component is a disk 8 attached to the hub 9 of a spindle motor 10, which spins the disk in the direction of arrow R in FIG. 1. The body of the spindle motor 10 is mounted in a well in the base 4, below the median plane 7 of the disk, as shown in FIG. 4. The disk 8 spins in an enclosure, defined by the base 4 and cover 6, that is semi-hermetically sealed to avoid contamination of the disk surfaces.

The disk 8 has a first or upper surface 8A and a second or lower surface 8B. Although the words "upper" and "lower" are used, this is for convenience of description, and does not imply that the disk drive must operate in the illustrated orientation. The letters A and B will be used throughout the following description to denote components associated with the upper (A) and lower (B) disk surfaces.

Figure 2:
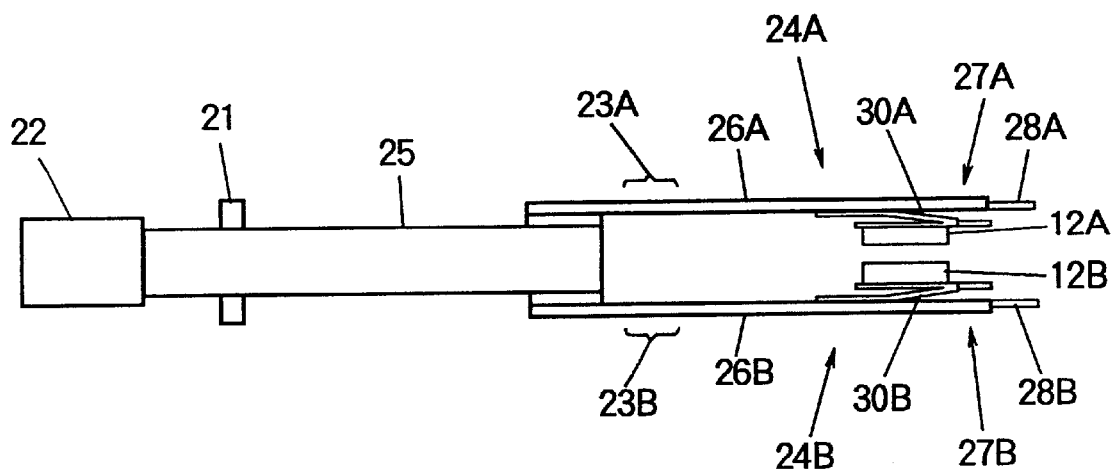
FIG. 2 is a sectional side view of the head/arm assembly, as seen from line 2—2 in FIG. 1.
Figure 3:
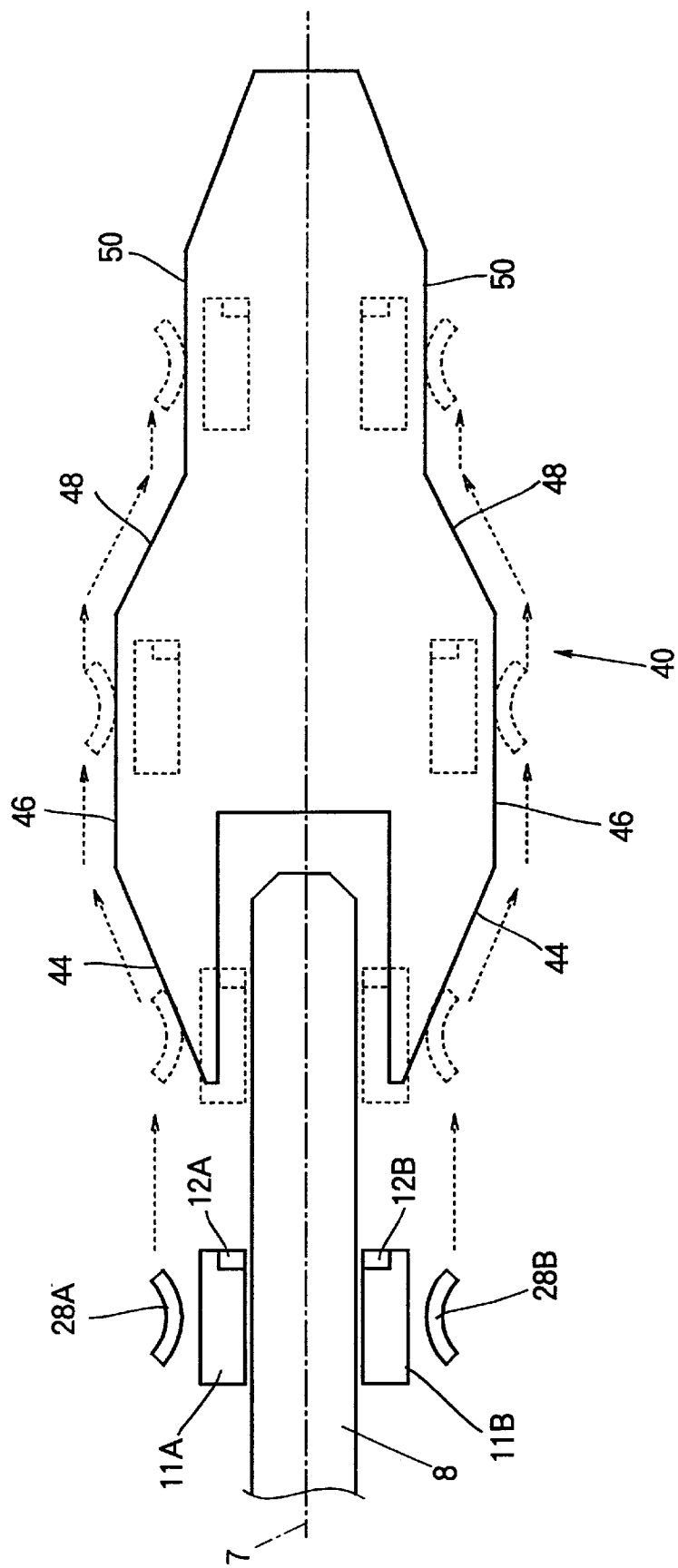
FIG. 3 is a sectional view of a conventional LUL ramp.

The disk drive has sliders 11A, 11B and read/write heads 12A, 12B as shown in FIG. 2. The read/write heads 12A, 12B are magnetic heads, comprising inductive write heads and magnetoresistive read heads, that access data on the disk 8 as the sliders 11A, 11B fly on an air bearing just above the disk surface.

The disk drive also has an electronics card 15 disposed in a bottom recess 16 of the base 4, enclosed by a lower cover 17, as seen in FIG. 4. Electronic components 18 are mounted on the electronics card 15, in some places on both sides of the of the electronics card.

The head/arm assembly 20 shown in FIG. 1 pivots on the shaft 21 to allow the read/write heads 12A, 12B to access different areas on the disk 8, to load the read/write heads onto the disk when the disk drive is powered on, and to unload the read/write heads from the disk when the disk drive is powered off. The shaft 21 is attached to the base 4. An actuator coil 22, mounted at one end of the actuator arm 25 in the head/arm assembly 20, forms part of a voice coil motor (VCM) that turns the head/arm assembly 20 on its shaft 21. (Other parts of the VCM are not visible.)

The two head suspension assemblies, referred to below as head gimbal assemblies (HGAs) 24A, 24B, are attached to the other end of the actuator arm 25. The load beams 26A, 26B in the HGAs 24A, 24B taper toward their distal ends 27A, 27B, where the tabs 28A, 28B shown in FIG. 2 are located. Hinge areas 23A, 23B, also shown in FIG. 2, act as flat springs, urging the distal ends of the load beams toward the disk. The flexures 30A, 30B that suspend the sliders 11A, 11B are disposed near the distal ends 27A, 27B of the load beams 26A, 26B.

Figure 5:
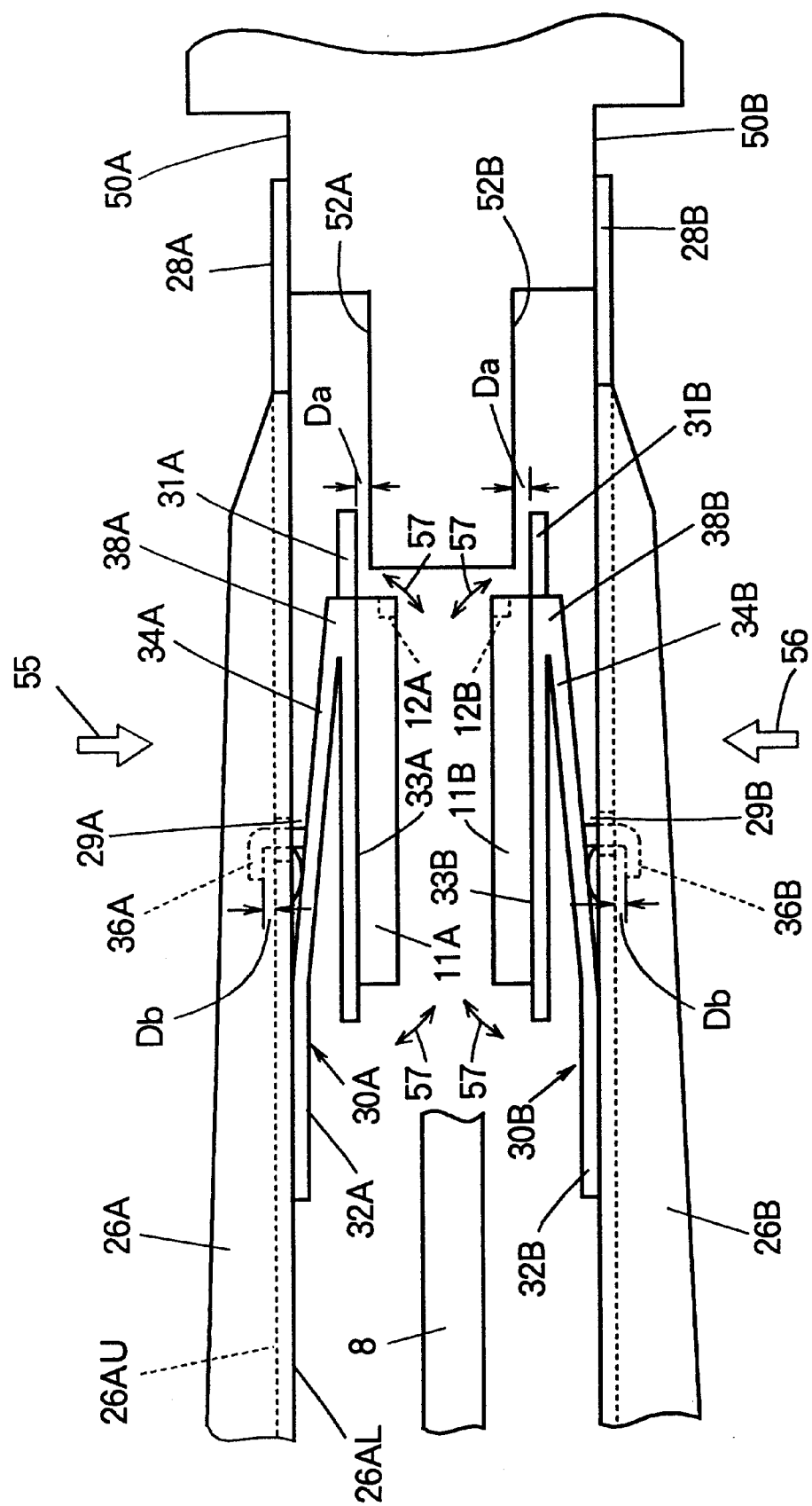
FIG. 5 is a side view of the head suspension assemblies in their parked position.
Figure 6:
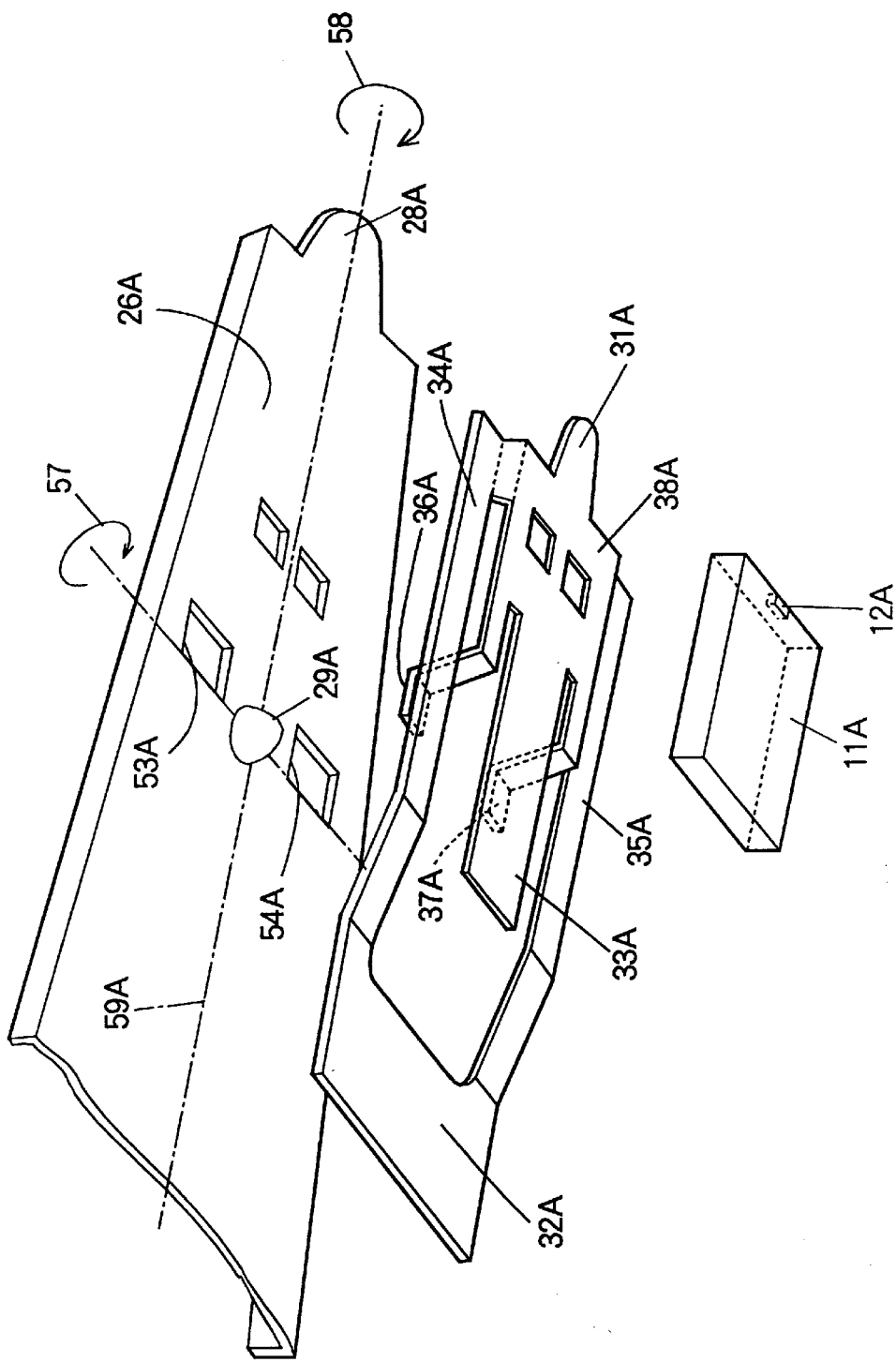
FIG. 6 is an exploded perspective view of a slider, a flexure, and a load beam.
Figure 7:
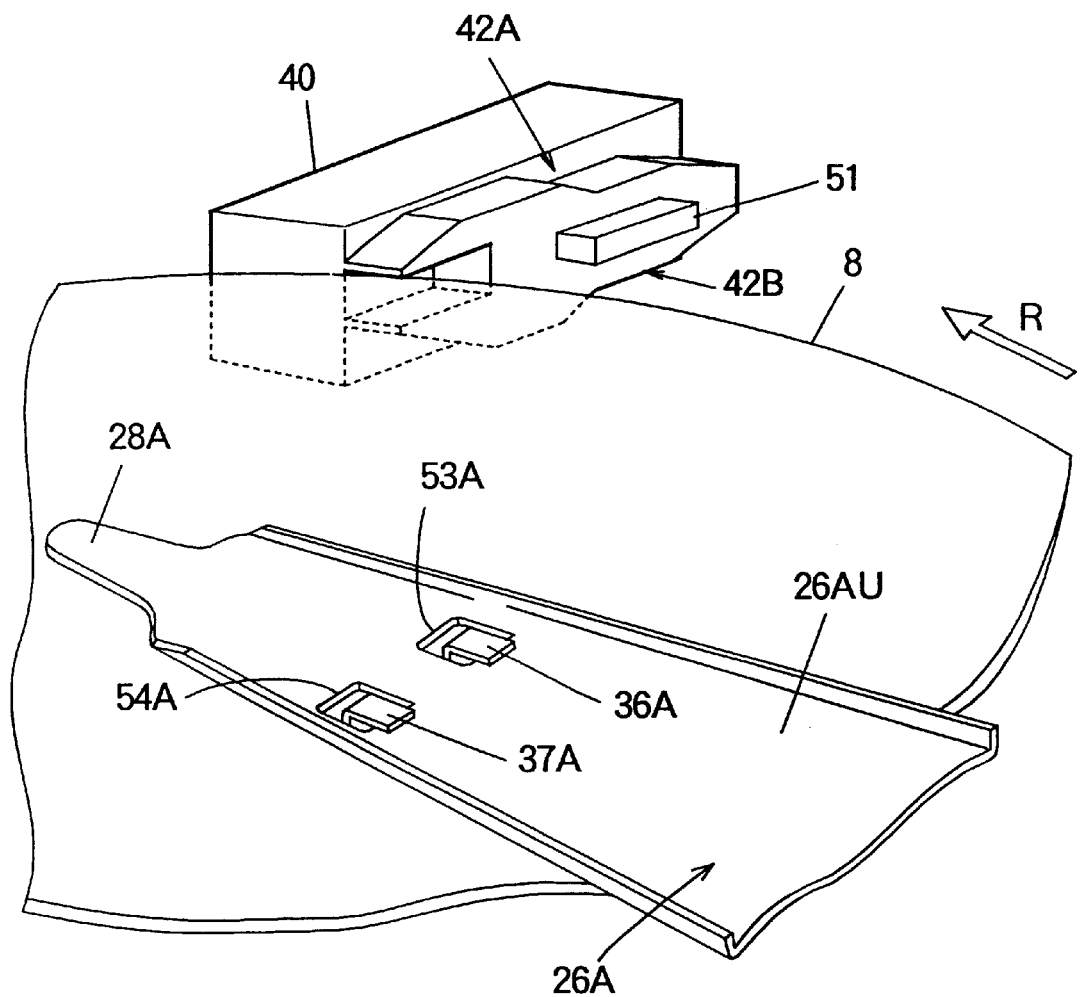
FIG. 7 is a perspective view of the disk, showing a portion of a load beam and the LUL ramp.

Referring now to FIGS. 5, 6, and 7, the flexures 30A, 30B have stiff extensions 31A, 31B that extend toward the distal ends of the load beams 26A, 26B, while the inner ends 32A, 32B of the flexures are attached to the load beams. The flexures 30A, 30B also have tongues 33A, 33B, to which the sliders 11A, 11B are attached with adhesive, delicate flexible legs 34A, 34B, 35A, 35B that preload the sliders 11A, 11B against dimples 29A, 29B in the load beams 26A, 26B, and hook parts 36A, 36B, 37A, 37B that extend from the tongues through apertures 53A, 53B, 54A, 54B in the load beams 26A, 26B. Hook parts 36A, 37A are disposed on opposite sides of the centerline 59A of load beam 26A. Hook parts 36B, 37B are disposed on opposite sides of the centerline 59B of load beam 26B. (Leg 35B, hook part 37B, apertures 53B and 54B, and centerline 59B are not shown in the drawings).

The flexible legs 34A, 34B, 35A, 35B allow the sliders 11A, 11B to pitch and roll on the dimples 29A, 29B. The pitching motion 57 and rolling motion 58 take place as shown in FIG. 6. The same flexibility that allows the pitching and rolling motions also allows the sliders 11A, 11B to separate from the dimples by moving in the directions of arrows 55 and 56 in FIG. 5.

When the head/arm assembly 20 is turned outward to the disk perimeter, the tabs 28A, 28B at the ends of the load beams 26A, 26B move onto the LUL ramp 40 shown in FIG. 1. The LUL ramp 40 is attached to the base 4. As shown in FIG. 7, the LUL ramp 40 has first and second compound surfaces 42A, 42B disposed on opposite sides of the disk 8, extending in approximately the radial direction of the disk 8. The LUL ramp 40 also has a protrusion 51 that extends sideways, approximately perpendicular to the radial direction.

Figure 8:
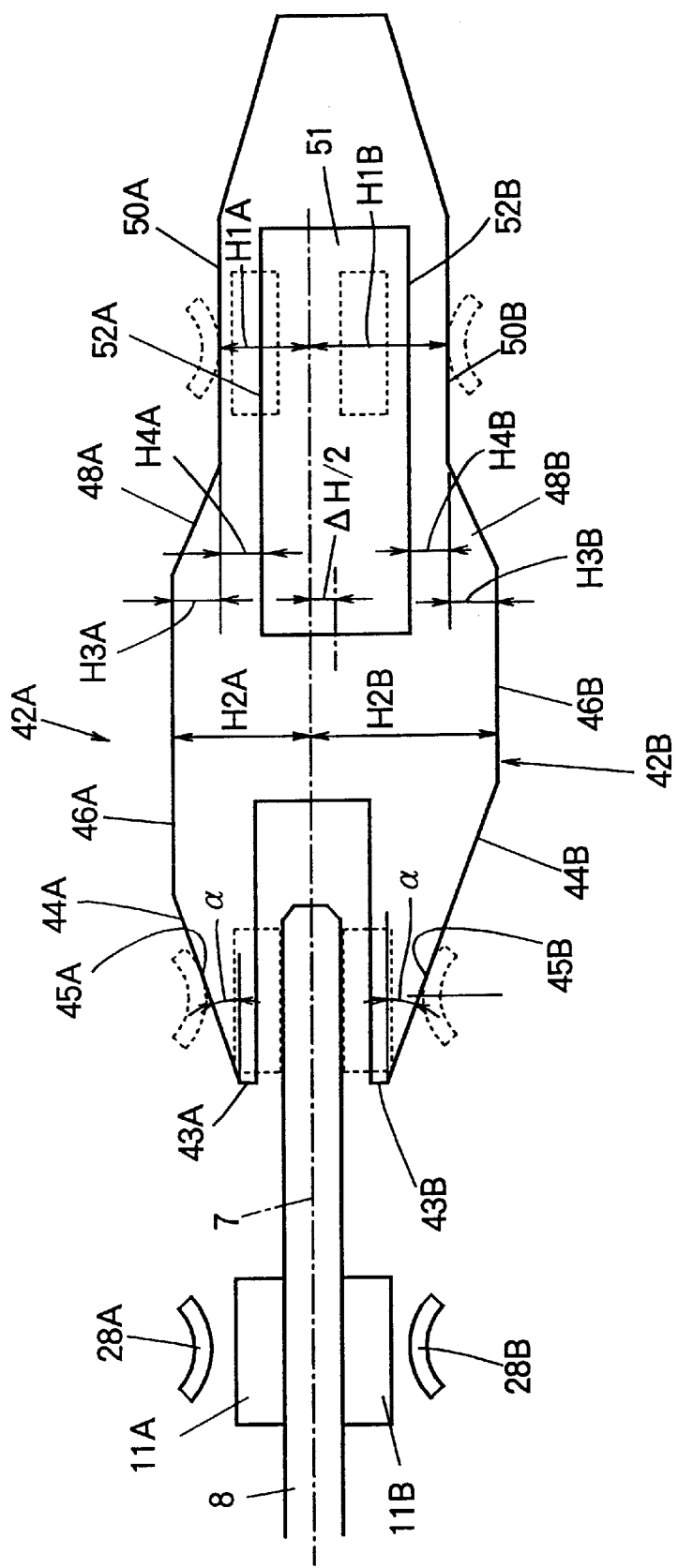
FIG. 8 is an enlarged sectional view of the LUL ramp in FIG. 4.

Referring to FIG. 8, the first compound surface 42A has a front end 43A, a lifting slope 44A, a maximum lift surface 46A, a back slope 48A, and a parking surface 50A, as in the prior art. The second compound surface 42B likewise has a front end 43B, lifting slope 44B, maximum lift surface 46B, back slope 48B, and parking surface 50B. The two front ends 43A, 43B are mutually aligned inside the perimeter of the disk 8. The lifting slopes 44A, 44B rise from the front ends 43A, 43B to the maximum lift surfaces 46A, 46B, which are parallel to the median plane 7 of the disk. Both lifting slopes 44A, 44B are inclined at the same angle a to the median plane 7. The maximum lift surfaces 46A, 46B are the parts of the compound surfaces 42A, 42B that are most distant from the median plane 7. The back slopes 48A, 48B extend from the maximum lift surfaces 46A, 46B to the parking surfaces 50A, 50B, which are disposed outside the disk perimeter.

The invented LUL ramp 40 is asymmetrical. The distance H1B from the second parking surface 50B to the median plane 7 of the disk 8 is greater than the distance H1A from the first parking surface 50A to the median plane 7. Likewise, the distance H2B from the second maximum lift surface 46B to the median plane 7 is greater than the distance H2A from the first maximum lift surface 46A to the median plane 7. The difference DH between H1A and H1B is equal to the difference DH between H2A and H2B. The height H3A of the first back slope 48A is equal to the height H3B of the second back slope 48B.

The protrusion 51 has limiter surfaces 52A, 52B. The distance H4A from the first parking surface 50A to the first limiter surface 52A is equal to the distance H4B from the second parking surface 50B to the second limiter surface 52B. The median plane 49 of the protrusion 51 is offset by DH/2 from the median plane 7 of the disk.

Next, the unloading and loading operations will be described.

In the loaded state, the spring-like hinge areas 23A, 23B of the load beams 26A, 26B act through the dimples 29A, 29B to urge the sliders 11A, 11B against the disk surfaces 8A, 8B. The flexures 30A, 30B allow the sliders 11A, 11B to pitch and roll, enabling the air bearing action of the sliders to maintain the proper orientation of the sliders with respect to the disk surface as the sliders fly over the disk surface. The tabs 28A, 28B are removed from the compound surfaces 42A, 42B of the LUL ramp 40.

In the unload sequence, the head/arm assembly 20 pivots outward, moving the sliders 11A, 11B across the disk 8, and bringing the tabs 28A, 28B into contact with the lifting slopes 44A, 44B at landing points or touch points 45A, 45B in FIG. 8. After landing at the touch points, the tabs 28A, 28B travel up the lifting slopes 44A, 44B, across the maximum lift surfaces 46A, 46B, and down the back slopes 48A, 48B to the parking surfaces 50A, 50B. The outward motion of the head/arm assembly 20 is arrested by crash stops (not visible) at a position such that the tabs 28A, 28B rest on the parking surfaces 50A, 50B. In this position, the HGAs 24A, 24B, sliders 11A, 11B, and read/write heads 12A, 12B are said to be parked.

When the HGAs 24A, 24B are parked, the flexure extensions 31A, 31B confront the limiter surfaces 52A, 52B of the protrusion 51, as shown in FIG. 5. The protrusion 51 extends only as far as the flexure extensions 31A, 31B, and does not reach the sliders 11A, 11B.

In the loading sequence, the head/arm assembly 20 pivots inward. The tabs 28A, 28B leave the parking surfaces 50A, 50B, climb the back slopes 48A, 48B, cross the maximum lift surfaces 46A, 46B, then descend the lifting slopes 44A, 44B. Before the tabs 28A, 28B reach the front ends 43A, 43B, the sliders 11A, 11B approach the disk surface and gain flying force due to air bearing action, and the tabs 28A, 28B separate from the lifting slopes 44A, 44B.

Next, the shock tolerance performance of the disk drive in the unloaded state will be described.

If the disk drive experiences sudden acceleration or shock while the HGAs 24A, 24B are parked, the sliders 11A, 11B respond by pitching and rolling. The sliders 11A, 11B may also move away from the dimples 29A, 29B as indicated by arrows 55 and 56 in FIG. 5, and approach each other due to out-of-phase motion of the two load beams 26A, 26B or the two flexures 30A, 30B. The following factors, however, enable the disk drive to survive strong acceleration or shock without collision between the parked sliders 11A, 11B.

A first factor is that pitching motion 57 is limited by the hook parts 36A, 36B, 37A, 37B, which cannot move inward past the outer surfaces 26AU and 26BU of the load beams 26A, 26B, and is also limited by the flexure extensions 31A, 31B, which cannot move inward past the limiter surfaces 52A, 52B of the protrusion 51.

A second factor is that the hook parts 36A, 36B, 37A, 37B, being disposed on both sides of the center lines of the load beams 26A, 26B, limit rolling motion 58.

A third factor is that even if the sliders 11A, 11B separate from the dimples 29A, 29B, the hook parts 36A, 36B, 37A, 37B limit motion in the directions of arrows 55 and 56.

A fourth factor is the extra distance DH between the second parking surface 50B and the median plane 7 of the disk. Compared with a symmetric LUL ramp, the invented LUL ramp 40 provides an additional separation of DH between the parked sliders 11A, 11B, making it that much more difficult for the sliders to collide.

The hook parts 36A, 36B, 37A, 37B and limiter surfaces 52A, 52B do not completely prevent motion of the parked sliders 11A, 11B, so in a very small disk drive, the first three factors listed above become inadequate. If the sliders 11A, 11B are parked too close together, it is simply not possible to keep them from colliding. It is the fourth factor, when combined with the first three factors, that enables a disk drive to be both very small and very rugged.

It is anticipated that the present invention will be useful in improving the ruggedness of disk drives with dimensions comparable to those of disk drives manufactured at present. An example is a disk drive with a total thickness, from the top cover 6 to the bottom of the base 4, of slightly less than 6.5 mm, and a disk thickness of slightly less than 0.64 mm, in which the distance from the upper surface 8A of the disk to the inner surface of the cover 6 is slightly less than 1.0 mm. It is also anticipated that, by permitting the separation between the parked sliders to be considerably greater than the thickness of the disk, the invention will permit the manufacture of still smaller rugged disk drives, including disk drives with an overall thickness less than 5.0 mm and a disk thickness less than 0.4 mm, in which the distance from the upper surface 8A of the disk to the inner surface of the cover 6 is less than 0.9 mm.

Next, a brief description will be given of the design of certain distances in the invented disk drive.

Referring to FIG. 5, to minimize pitching amplitude, the distance Da between the flexure extensions 31A, 31B and limiter surfaces 52A, 52B and the distance Db between the hook parts 36A, 36B, 37A, 37B and the outer surfaces 26AU, 26BU of the load beams 26A, 26B should be selected so that the hook parts 36A, 36B, 37A, 37B touch the outer surfaces 26AU, 26BU of the load beams before the flexure extensions 31A, 31B touch the limiter surfaces 52A, 52B. The specific distances Da and Db should be determined according to the bending stiffness of the load beams, the size of the sliders, the size of the load beams, the size of the flexures, and other mechanical parameters.

Referring to FIG. 8, the height H3A, H3B of the back slopes 48A, 48B should be the minimum height needed to prevent escape of the tabs 28A, 28B from the parking surfaces 50A, 50B during anticipated shock events.

The height of the first lifting slope 44A, as measured from the first disk surface 8A, should be the minimum height required for reliable loading and unloading of the first slider 11A and read/write head 12A. This minimum height depends on various dimensional tolerances in the head/arm assembly, which allow the touch point 45A to vary, as well as on bending distortion of the first load beam 26A, and on air bearing surface force characteristics as the slider 11A flies above the disk surface 8A. The height from the nominal touch point 45A to the first maximum lift surface 46A should exceed the height from the front end 43A to the nominal touch point 45A by an amount sufficient to accommodate induced bending in the load beam 26A as the tab 28A is lifted and the point of support of the distal end 27A of the load beam is transferred from the dimple 29A to the tab 28A.

The additional height should also accommodate variations in the pitch 20 and static roll angle of slider 11A, dynamic motion as slider 11A unloads from disk surface 8A, and nonlinear air bearing forces holding the slider 11A to the disk surface 8A as the tab 28A travels up the lifting slope 44A.

The height of the second lifting slope 44B, as measured from the second disk surface 8B, can be determined from the height of the first lifting slope 44A by adding the amount necessary to provide a safe separation between the parked sliders 11A, 11B. The second lifting slope 44B can be as high as permitted by the space between the second surface 8B of the disk and the base 4.

The disk 8 is typically located as close as possible to the top cover 6 of the disk drive, to provide adequate space for the numerous components disposed below the median plane 7 of the disk. These components include electronic components 18 on both sides of the electronics card 15, the body of the spindle motor 10, and components associated with the head/arm assembly 20, such as the magnet of a one-magnet VCM. Accordingly, there is typically more space available between the base 4 and disk 8 than between the disk 8 and cover 6, as measured on a line normal to the median plane 7, passing through the LUL ramp 40. The present invention makes good use of this extra space to increase the ruggedness of the disk drive, without adversely affecting the package dimensions of the disk drive.

The height of the second lifting slope 44B should not be increased more than necessary, because additional height requires additional climbing energy during the unloading sequence.

Figure 9:
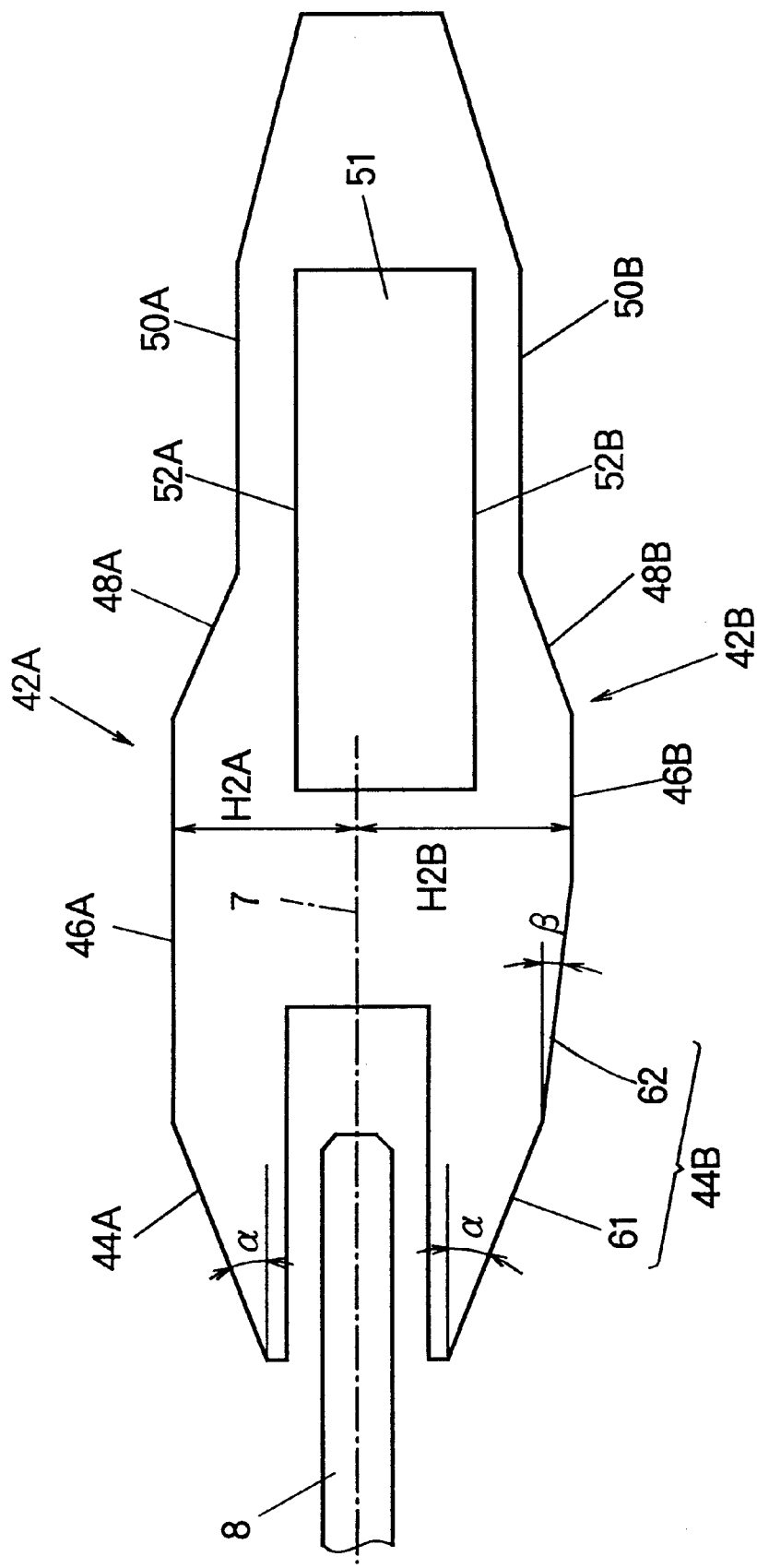
FIG. 9 is a sectional view of another LUL ramp according to the present invention.

In the embodiment described above, the second lifting slope 44B has a constant angle of inclination. FIG. 9 shows a modification in which the second lifting slope 44B comprises a first part 61 and a second part 62. The first part 61 is a mirror image of the first lifting slope 44A. The second part 62 is connected to the first part 61, and has an angle of inclination b shallower than the angle of inclination a of the first part 61. The lift height of the first part 61 is identical to the minimum required lift height of the first lifting slope 44A. The distance H2B from the second maximum lift surface 46B to the median plane 7 of the disk is the same as in FIG. 8, but this maximum lift surface 46B is shorter than in FIG. 8. The LUL ramp shown in FIG. 9 is identical to the LUL ramp shown in FIG. 8 in all other respects.

Because of the shallow angle of inclination b of the second part 62 of the second lifting slope 44B, the torque required to move tab 28B up the second part 62 is reduced, but the torque must be applied for a longer time. The modification shown in FIG. 9 allows the physical profile of the second lifting slope 44B to be matched more closely to the torque/time profile of the VCM during the unload sequence, which depends on the time constants of electronic components that provide energy to the actuator coil 22 during the unload sequence.

Those skilled in the art will recognize that other modifications are possible within the scope claimed below.

What is claimed is:

1. A load/unload ramp for use in a disk drive having a disk and a head/arm assembly, the disk having a first surface, a second surface, a perimeter, and a median plane passing between the first surface and the second surface, the head/arm assembly having a first load beam with a first tab, a first read/write head suspended from the first load beam toward the first surface of the disk, a second load beam with a second tab, and a second read/write head suspended from the second load beam toward the second surface of the disk, the head/arm assembly pivoting to load the first read/write head and the second read/write head onto the disk and unload the first read/write head and the second read/write head from the disk, the load/unload ramp engaging the first tab and the second tab when the first read/write head and the second read/write head are being loaded and unloaded, the load/unload ramp comprising:

a first compound surface disposed on one side of the median plane of the disk, having a first parking surface disposed outside the perimeter of the disk, the first tab resting on the first parking surface when the first read/write head and the second read/write head have been unloaded, the first parking surface separated from the median plane of the disk by a first distance; and a second compound surface disposed on another side of the median plane of the disk, having a second parking surface disposed outside the perimeter of the disk, the second tab resting on the second parking surface when the first read/write head and the second read/write head have been unloaded, the second parking surface separated from the median plane of the disk by a second distance;

wherein said second distance is greater than said first distance.

2. The load/unload ramp according to claim 1, wherein the first compound surface also has a first front end disposed beside the first surface of the disk;

a first maximum lift surface disposed between the first front end and the first parking surface, farther than the first front end and the first parking surface from the median plane of the disk;

a first lifting slope extending from the first front end to the first maximum lift surface; and a first back slope extending from the first maximum lift surface to the first parking surface; and the second compound surface also has a second front end disposed beside the second surface of the disk, aligned with the first front end;

a second maximum lift surface disposed between the second front end and the second parking surface, located farther than the second front end and the second parking surface from the median plane of the disk, and farther than the first maximum lift surface from the median plane of the disk;

a second lifting slope extending from the second front end to the second maximum lift surface; and a second back slope extending from the second maximum lift surface to the second parking surface.

3. The load/unload ramp according to claim 2, wherein the first lifting slope and the second lifting slope have substantially equal angles of inclination with respect to the median plane of the disk.

4. The load/unload ramp according to claim 2, wherein:

the second lifting slope comprises a first part and a second part, the first part leading from the second front end to the second part;

the second part has a shallower angle of inclination than the first part with respect to the median plane of the disk; and the first lifting slope and the first part of the second lifting slope are of equal length and have substantially equal angles of inclination with respect to the median plane of the disk.

5. The load/unload ramp according to claim 1, wherein:

the first read/write head is suspended from the first load beam by a first flexure permitting the first read/write head to pitch and roll;

the second read/write head is suspended from the second load beam by a second flexure permitting the second read/write head to pitch and roll;

the first flexure has a first flexure extension;

the second flexure has a second flexure extension; and the load/unload ramp further comprises a protrusion with surfaces confronting the first flexure extension and the second flexure extension at a predetermined distance, thereby preventing the first read/write head and the second read/write head from pitching and rolling by more than a certain amount, when the first tab rests on the first parking surface and the second tab rests on the second parking surface.

6. A disk drive, comprising:

a disk for storing data, having a first surface, a second surface, a perimeter, and a median plane passing midway between the first surface and the second surface;

a head/arm assembly having a first load beam with a first tab, a first read/write head suspended from the first load beam toward the first surface of the disk, a second load beam with a second tab, and a second read/write head suspended from the second load beam toward the second surface of the disk, the head/arm assembly pivoting to load the first read/write head and the second read/write head onto the disk and unload the first read/write head and the second read/write head from the disk; and a load/unload ramp engaging the first tab and the second tab when the first read/write head and the second read/write head are being loaded and unloaded, the load/unload ramp having a first compound surface disposed on one side of the median plane of the disk, having a first parking surface disposed outside the perimeter of the disk, the first tab resting on the first parking surface when the first read/write head and the second read/write head have been unloaded, the first parking surface separated from the median plane of the disk by a first distance; and a second compound surface disposed on another side of the median plane of the disk, having a second parking surface disposed outside the perimeter of the disk, the second tab resting on the second parking surface when the first read/write head and the second read/write head have been unloaded, the second parking surface separated from the median plane of the disk by a second distance greater than said first distance.

7. The disk drive according to claim 6, wherein the first compound surface also has a first front end disposed beside the first surface of the disk;

a first maximum lift surface disposed between the first front end and the first parking surface, farther than the first front end and the first parking surface from the median plane of the disk;

a first lifting slope extending from the first front end to the first maximum lift surface; and a first back slope extending from the first maximum lift surface to the first parking surface; and the second compound surface also has a second front end disposed beside the second surface of the disk, aligned with the first front end;

a second maximum lift surface disposed between the second front end and the second parking surface, located farther than the second front end and the second parking surface from the median plane of the disk, also farther than the first maximum lift surface from the median plane of the disk;

a second lifting slope extending from the second front end to the second maximum lift surface; and a second back slope extending from the second maximum lift surface to the second parking surface.

8. The disk drive according to claim 7, wherein:

the first maximum lift surface is disposed at a first height with respect to the first surface of the disk, measured perpendicular to the median plane of the disk;

the second maximum lift surface is disposed at a second height with respect to the second surface of the disk, measured perpendicular to the median plane of the disk;

the first height is a minimum height required for reliable loading and unloading of the first read/write head, as determined from dimensional tolerances of the head/arm assembly, bending distortion of the first load beam, and air bearing surface force characteristics when the first read/write head flies above the disk; and the second height is determined by adding to the first height an amount providing a required separation between the first read/write head and the second read/write head when the first tabs rests on the first parking surface and the second tab rests on the second parking surface.

9. A disk drive, comprising:

a spindle motor with a body and a hub;

a disk for storing data, attached to the hub of the spindle motor, having a first surface, a second surface, a perimeter, and a median plane, the first surface being disposed on a first side of the median plane, the second surface and the body of the spindle motor being disposed on a second side of the median plane;

a head/arm assembly having a first load beam with a first tab, a first read/write head suspended from the first load beam toward the first surface of the disk, a second load beam with a second tab, and a second read/write head suspended from the second load beam toward the second surface of the disk, the head/arm assembly pivoting to load the first read/write head and the second read/write head onto the disk and unload the first read/write head and the second read/write head from the disk; and a load/unload ramp engaging the first tab and the second tab when the first read/write head and the second read/write head are being loaded and unloaded, the load/unload ramp having a first compound surface disposed on the first side of the median plane of the disk, having a first parking surface disposed outside the perimeter of the disk, the first tab resting on the first parking surface when the first read/write head and the second read/write head have been unloaded, the first parking surface separated from the median plane of the disk by a first distance; and a second compound surface disposed on the second side of the median plane of the disk, having a second parking surface disposed outside the perimeter of the disk, the second tab resting on the second parking surface when the first read/write head and the second read/write head have been unloaded, the second parking surface separated from the median plane of the disk by a second distance greater than said first distance.

10. The disk drive according to claim 9, further comprising:

a base in which the spindle motor is mounted; and a cover facing the first surface of the disk, the cover being closer than the base to the median plane of the disk, as measured through the load-unload ramp.

11. The disk drive according to claim 10, having a thickness of less than 6.5 mm measured perpendicular to the median plane of the disk, the disk having a thickness of less than 0.64 mm, the distance from the first surface of the disk to the cover being less than 1.0 mm.

12. The disk drive according to claim 10, having a thickness of less than 5 mm measured perpendicular to the median plane of the disk, the disk having a thickness of less than 0.4 mm, the distance from the first surface of the disk to the cover being less than 0.9 mm.

13. The disk drive according to claim 9, further comprising:

a first flexure suspending the first read/write head from the first load beam, permitting the first read/write head to pitch and roll, the first flexure having a first flexure extension; and a second flexure suspending the second read/write head from the second load beam, permitting the second read/write head to pitch and roll, the second flexure having a second flexure extension;

wherein the load/unload ramp also has a protrusion with surfaces confronting the first flexure extension and the second flexure extension at a predetermined distance, thereby preventing the first read/write head and the second read/write head from pitching and rolling by more than a certain amount, when the first tab rests on the first parking surface and the second tab rests on the second parking surface.

* * * * *